Patented Apr. 21, 1925.                                                               1,534,420

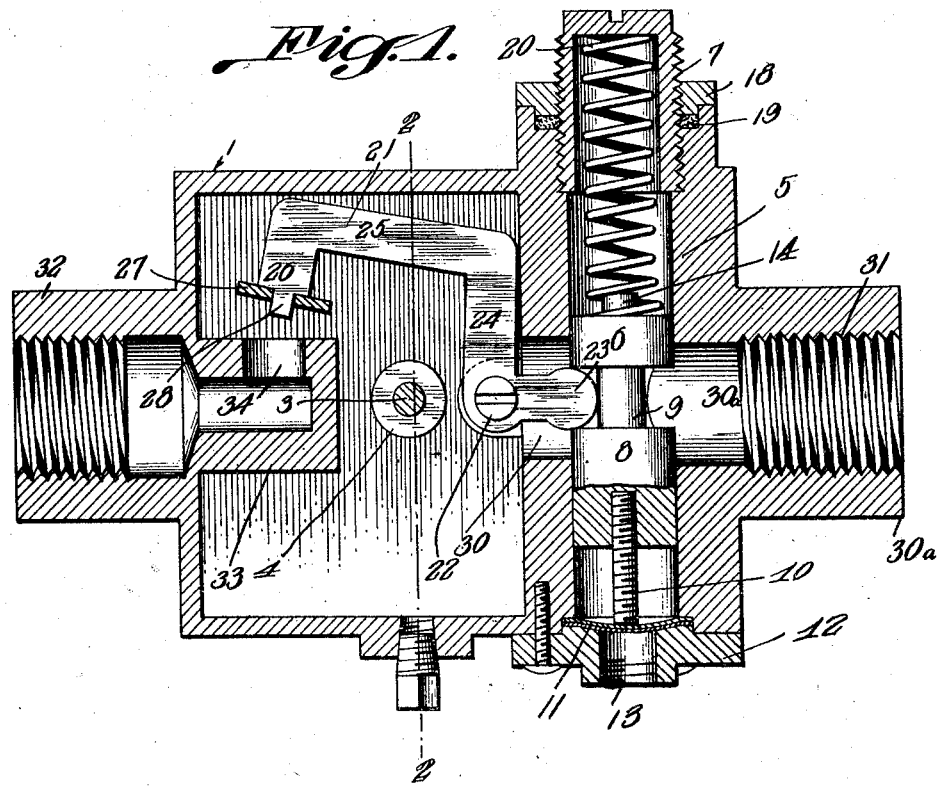

UNITED STATES PATENT OFFICE.

J HARLEY SMITH, OF SAN FRANCISCO, CALIFORNIA.

REGULATING VALVE.

Application filed April 8, 1924. Serial No. 704,999.

*To all whom it may concern:*

Be it known that I, J HARLEY SMITH, a citizen of the United States, residing at San Francisco, in the county of San Francisco and State of California, have invented a new and useful Regulating Valve, of which the following is a specification.

This invention relates to valves, and more particularly to reducing or regulating valves for gas lines or other pressure systems.

The object of the invention is to provide a simply constructed device of this character capable of automatically retaining the pressure fluid at any desired pressure and which is operable by said pressure fluid to control the passage of fluid through the valve.

Another object is to provide pressure controlled means whereby two valves are operated, one being operated by the other.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a horizontal section through a valve constructed in accordance with this invention, and Fig. 2 is a transverse section taken on the line 2—2, Fig. 1.

In the embodiment illustrated, the housing 1 shown is of any suitable shape provided with a removable closure 2 which is here shown secured by means of a bolt 3 passing centrally therethrough and engaging a boss 4 in the bottom of the housing.

Extending through the housing 1 is a cylinder 5 in which is mounted to reciprocate a plunger 6 preferably constructed of brass and having a central shank 9 connecting with it an enlarged head 8. This head 8 is equipped at its outer end with a stud 10 which bears against a flexible diaphragm 11 mounted over the outer end of cylinder 5. This diaphragm is shown clamped to the cylinder end by a collar 12 which is secured by screws and has a threaded bore 13 to provide for its connection with a pressure fluid supply pipe (not shown). This diaphragm may be composed of any suitable material according to the pressure fluid to be employed in connection with the valve. When steam is to be used, this washer should be of expansive metal to prevent the heat destroying it.

Mounted in the other end of the cylinder 5 is a hollow nut 7 open at its inner end and closed at its outer end and having a locking nut 18 engaged therewith between which and the end wall of the cylinder is mounted a gasket 19.

A coiled spring 20 is mounted in the hollow nut 7 and bears at one end against the closed outer end wall thereof and at its other end against the plunger 6, said plunger having a reduced end 14 extending into the spring to hold it in position. It will be understood that the tension of this spring 20 is exerted against the fluid pressure bearing against plunger head 8 and controls the position of the plunger so that the opening formed around the reduced shank 9 thereof may be moved into and out of register with an opening 30 in one wall of the housing 1 to vary the fluid entering through said opening.

A tubular nipple or extension 30ª projects outward from the housing 1 opposite the opening 30 and is internally threaded as shown at 31, for connection of a pipe to supply fluid to be passed through the valve. A similar nipple or extension 32 is arranged in the wall opposite that having the opening 30 and has a hollow extension 33 projecting into the housing and provided in one side wall with an opening 34 which is controlled by a valve 27 now to be described.

The valve 27 is carried by a bell crank lever 21 fulcrumed at 22 adjacent the cylinder 5 within the housing 1. This bell crank has a short arm extending through the opening 30 into the cylinder and provided with a ball shaped terminal 23 located between the body portion 8 of the plunger and its head 8 so that the reciprocation will operate to rock the lever on its fulcrum. The lever arm 24 of this lever has a right angular extension 25 provided with a finger 28 extending parallel with the arm 24 which carries the valve 27 positioned to vary the size and to close the opening 34 in the outlet housing 33. The finger 26 is here shown provided at its free end with a longitudinally extending stud 28 on which is mounted the valve 27 and which may be of any suitable manner.

In the use of this valve, the collar 12 is connected with a pressure supply pipe while the extensions 31 and 32 are connected with pipes supplying fluid to be controlled by the valve and which passes through the housing 1. The plunger 6 is adjusted by means of the nut 7 which is screwed in the proper direction to control the tension of the spring 20, it being of course understood that the reducing of the tension of the spring will permit the plunger to move in the opposite direction against the pressure of the fluid admitted through the bore 13. It will thus be seen that this plunger may be positioned where desired to vary the size of the opening 30 by varying the tension of the spring 20 against the pressure entering through nut 12.

The inward movement of the plunger 6 actuates the bell crank 21 to open the valve 27 so that the openings 30 and 34 are simultaneously controlled, being enlarged or reduced according to the direction in which the plunger is moved, it being obvious that the outward movement of this plunger will swing the bell crank in the direction to close the valve 27.

This valve being connected as above described with the tubular extensions 31 and 32 connected with the gas line and the collar 12 with the pressure supply pipe, the flow of gas may be regulated by adjusting the screw nut 7 which will retain the pressure automatically at any given pressure.

Various changes in the form, shape, proportion and other minor details of construction may be made without departing from the principle or sacrificing any of the advantages of the claimed invention.

I claim:—

1. A device of the class described comprising a housing having two openings leading therefrom, valves connected to control said openings, a bell crank mounted for actuating said valves simultaneously a spring mounted to move said bell crank in one direction, and pressure controlled means connected to move it in the opposite direction.

2. In a device of the class described, a housing having openings therein, a plunger mounted to slide in said housing and having a valve to control one of said openings, a bell crank lever fulcrumed in said housing and having one arm mounted to be connected with said plunger, a valve carried by the other arm to control the other opening, a coiled spring mounted to move said plunger in one direction, means for adjusting the tension of said spring, and pressure controlled means for moving the plunger in the opposite direction.

3. The combination with a housing having a cylinder mounted therein, open at both ends and having openings in its side walls, a plunger mounted to reciprocate in said cylinder and having a reduced portion intermediate its ends to register with the side wall openings, a hollow nut closing one end of said cylinder, a lock nut for holding said nut in adjusted position, a coiled spring mounted in said hollow nut closing the other end of said cylinder and having a fluid-tight connection with said plunger, said tubular nut adapted to be connected with a pressure fluid-supply means whereby the plunger is moved in one direction by the spring and in the other direction by the fluid under pressure.

In testimony that I claim the foregoing as my own, I have hereto affixed my signature in the presence of two witnesses.

J HARLEY SMITH.

Witnesses:
BERNARD J. COLLUM,
MICHAEL K. CURRAN,